US012491526B2

(12) United States Patent
Delbove

(10) Patent No.: US 12,491,526 B2
(45) Date of Patent: Dec. 9, 2025

(54) PACKAGING DEVICE FOR A REFILL FITTED WITH A PUMP

(71) Applicant: L'OREAL, Paris (FR)

(72) Inventor: William Delbove, Clichy (FR)

(73) Assignee: L'Oreal, Paris (FR)

( * ) Notice: Subject to any disclaimer, the term of this patent is extended or adjusted under 35 U.S.C. 154(b) by 120 days.

(21) Appl. No.: 18/294,086

(22) PCT Filed: Jun. 13, 2022

(86) PCT No.: PCT/EP2022/066047

§ 371 (c)(1),
(2) Date: Jan. 31, 2024

(87) PCT Pub. No.: WO2023/030709

PCT Pub. Date: Mar. 9, 2023

(65) Prior Publication Data

US 2024/0342736 A1 Oct. 17, 2024

(30) Foreign Application Priority Data

Aug. 30, 2021 (FR) ..................................... 21 09039

(51) Int. Cl.
*B05B 11/00* (2023.01)
*A45D 34/00* (2006.01)
*B05B 11/10* (2023.01)

(52) U.S. Cl.
CPC ...... *B05B 11/0054* (2013.01); *B05B 11/0038* (2018.08); *B05B 11/1047* (2023.01); *A45D 2034/005* (2013.01)

(58) Field of Classification Search
CPC ............. B05B 11/0054; B05B 11/0038; B05B 11/1047; A45D 2034/005
See application file for complete search history.

(56) References Cited

U.S. PATENT DOCUMENTS

| | | | | |
|---|---|---|---|---|
| 8,998,020 | B2 * | 4/2015 | Sato | B05B 11/0038 222/105 |
| 9,861,177 | B2 | 1/2018 | Lefevre et al. | |
| 2015/0014359 | A1 | 1/2015 | Svidler | |
| 2016/0316887 | A1 * | 11/2016 | Maehr | A45D 40/18 |

(Continued)

FOREIGN PATENT DOCUMENTS

| | | | |
|---|---|---|---|
| WO | WO 2016/054160 | A1 | 4/2016 |
| WO | WO 2017/060631 | A1 | 4/2017 |
| WO | WO 2021/079060 | A1 | 4/2021 |

OTHER PUBLICATIONS

International Search Report issued Sep. 23, 2022 in PCT/EP2022/066047, filed on Jun. 13, 2022, 3 pages.

*Primary Examiner* — Jeremy Carroll
(74) *Attorney, Agent, or Firm* — Christensen O'Connor Johnson Kindness PLLC

(57) ABSTRACT

A packaging device, of longitudinal axis, is for a cosmetic product refill fitted with a pump dispenser system. The device includes a case provided with a cavity for accommodating the refill. The refill can be removably fixed to the open end of the case by a temporary joining mechanism between an insertion position and a taken-out position. The temporary joining mechanism includes an intermediate ring having on its radially inner face at least partially deformable projecting elements able to interact with an external holding surface of the refill.

20 Claims, 6 Drawing Sheets

(56) References Cited

U.S. PATENT DOCUMENTS

| | | | |
|---|---|---|---|
| 2017/0000237 A1 | 1/2017 | Lefevre et al. | |
| 2019/0060929 A1 | 2/2019 | Delmon et al. | |
| 2019/0247594 A1* | 8/2019 | Hsieh | B05B 1/10 |
| 2020/0197965 A1 | 6/2020 | Delmon et al. | |

* cited by examiner

[Fig. 1]
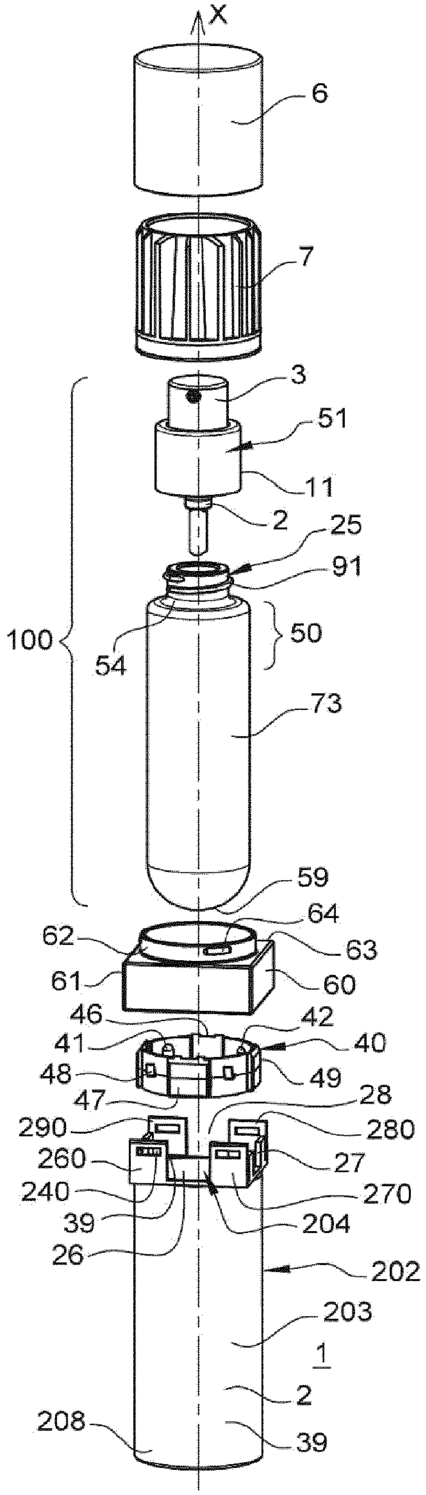

[Fig. 2]
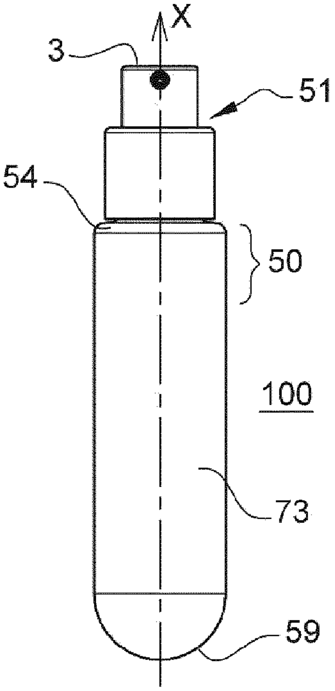
[Fig. 3]
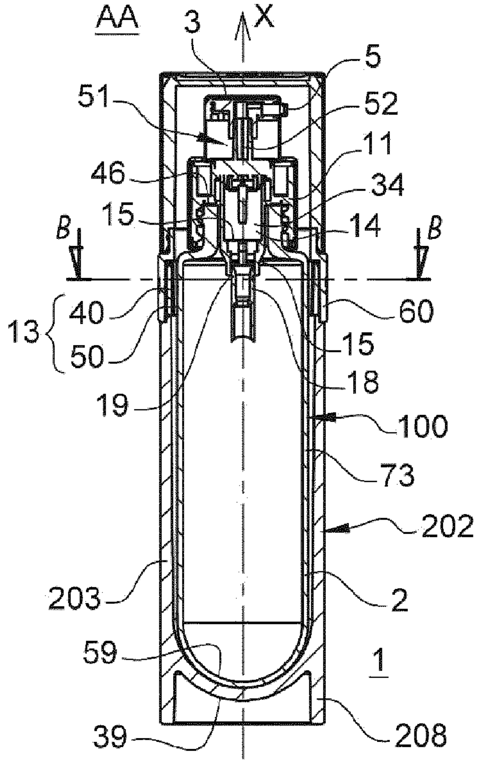

[Fig. 4]
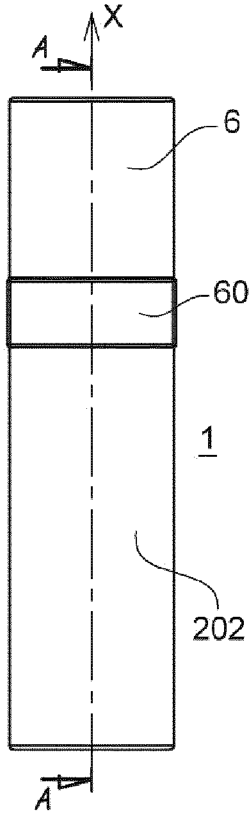
[Fig. 5]
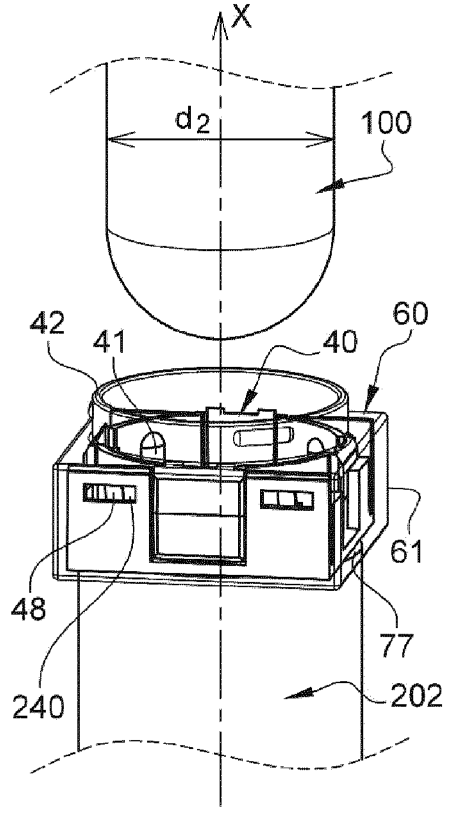

[Fig. 6]
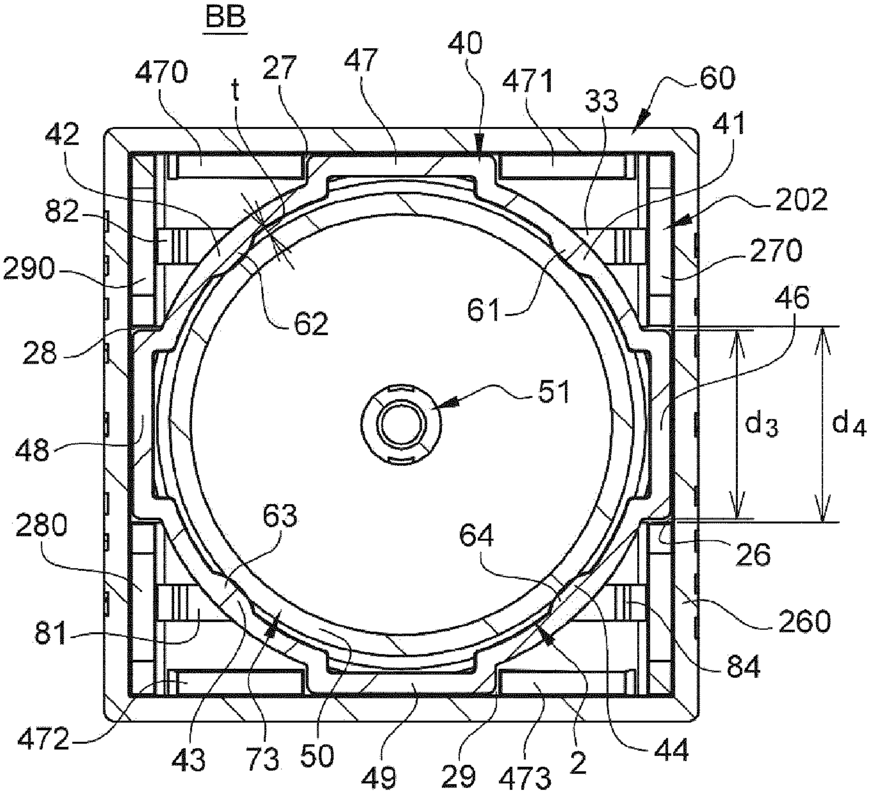
[Fig. 7]
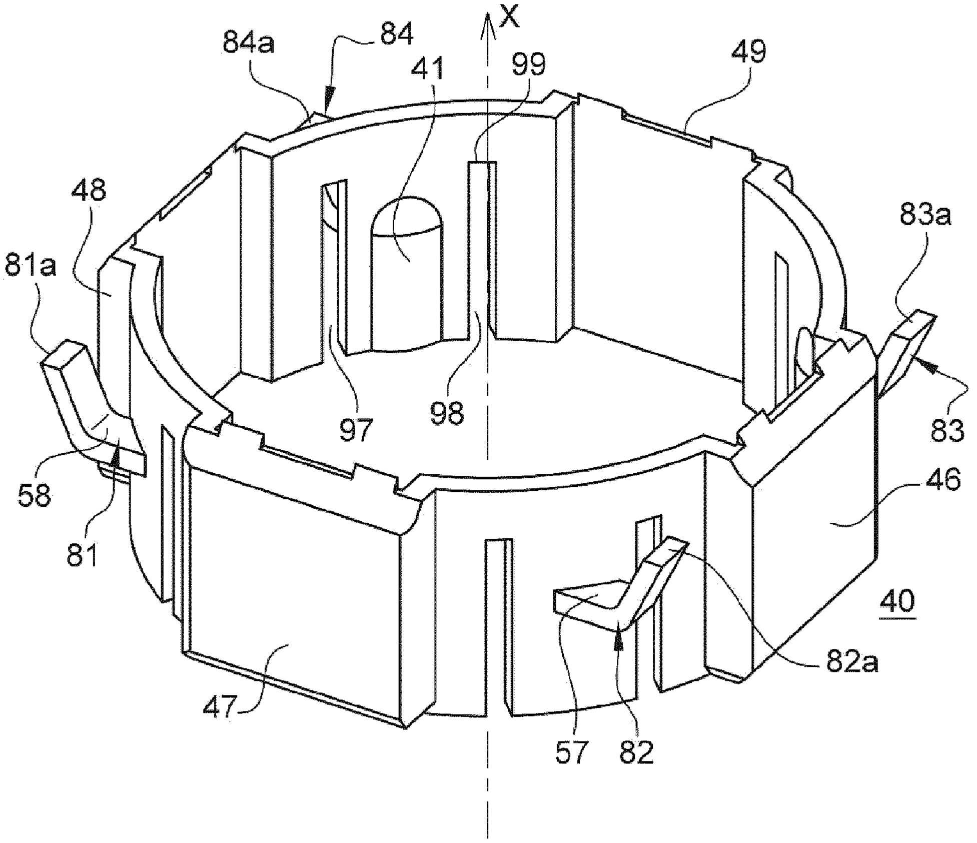

[Fig. 8]
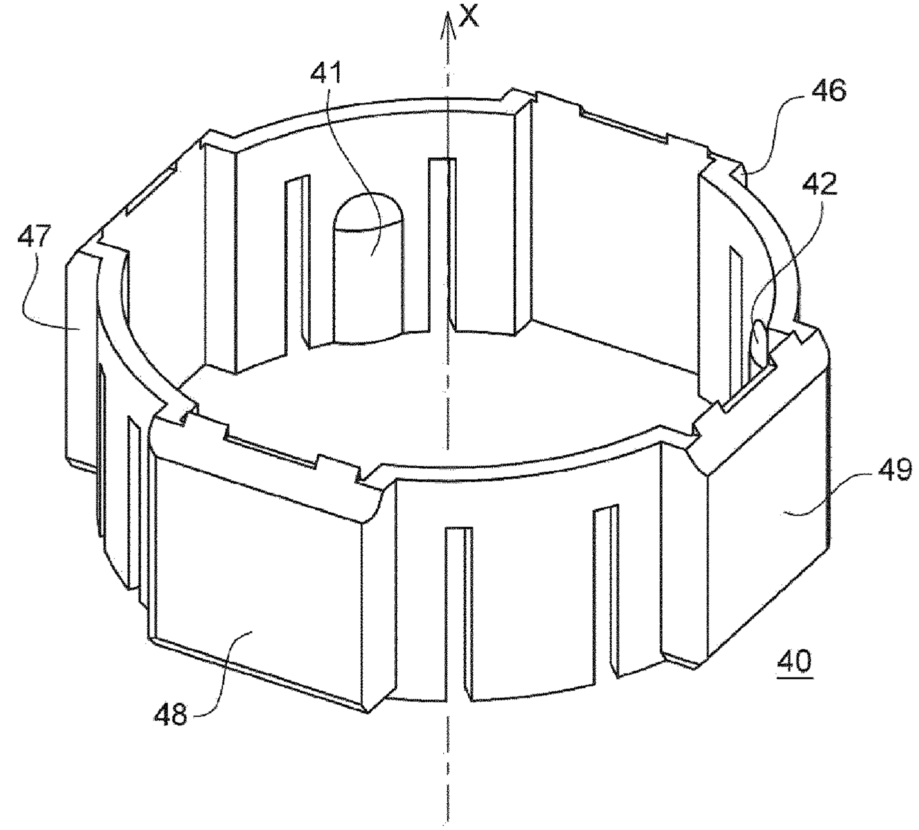
[Fig. 9]
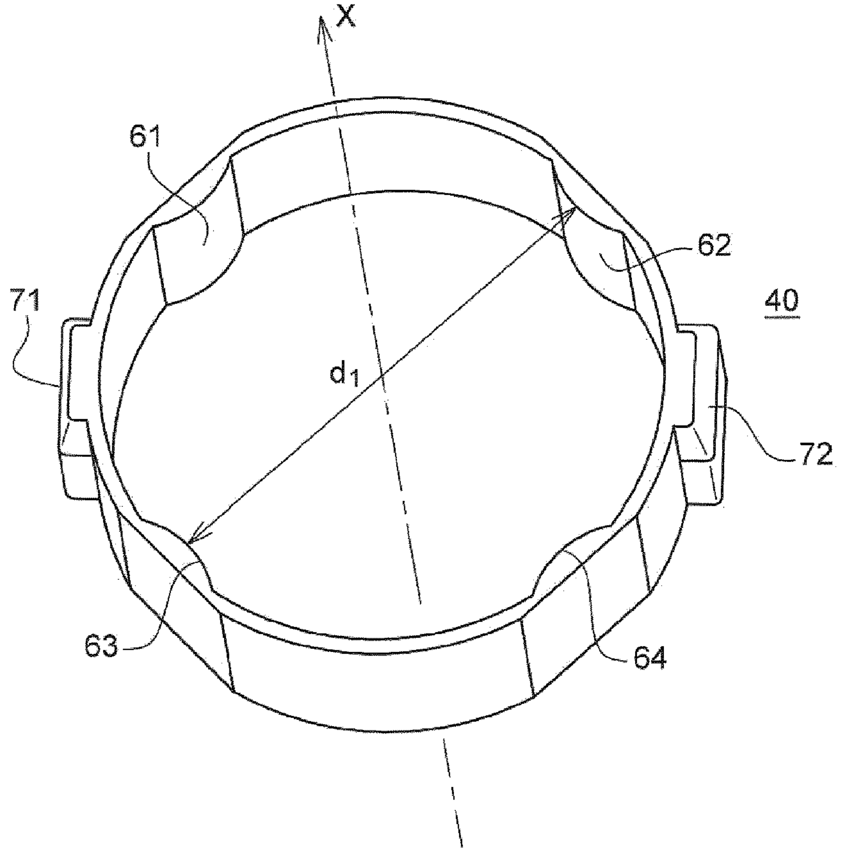

[Fig. 10]
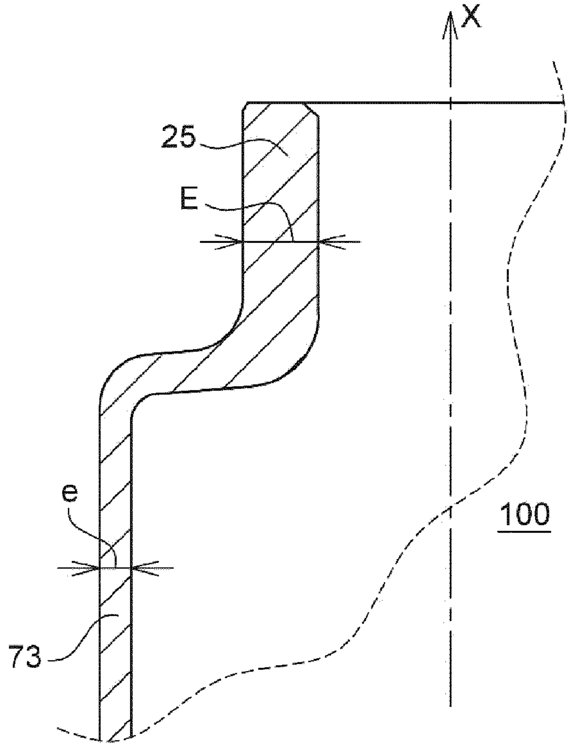

PACKAGING DEVICE FOR A REFILL FITTED WITH A PUMP

The present invention relates to packaging devices for a cosmetic product refill fitted with a pump dispenser system.

The cosmetic product may be a make-up product, such as a foundation or a tinted cream, a care product, such as a body gel or a moisturizing or anti-aging cream, a hair product, such as a styling spray or haircare spray.

PRIOR ART

Devices of this type are known, in particular for foundation cosmetics refills in a reusable case.

Documents U.S. Pat. No. 8,998,020, JP2010241505, U.S. Pat. No. 9,861,177, WO202179060 describe packaging devices with a refill.

In recent years, in particular in the field of cosmetics, this type of refill has been developed with the aim of reducing the manufacturing costs of the cosmetic packagings, and of reducing the environmental impact thereof.

There is an increasing need to gradually replace existing packagings with packaging devices accommodating cosmetic refills, in which case the case can be preserved once the cosmetic product has been used, only the refill being thrown away.

Once the refill is empty, all the user needs to do is release the removable assembly from the open end of the case and remove the refill so as to replace it with a new or different refill.

However, it is important for the one part that the packaging device exhibits the esthetic qualities required by the user, and for the other part that the handling operations for replacing a used refill are also as simple as possible for the user.

Thus, the type of packaging device must be simple to use and must make it possible to easily remove the refill it contains and to put a new refill in place easily, that is to say requiring little effort or attention on the part of the user.

The packaging device must likewise make it possible to easily lock the removable assembly on the open end of the case. Moreover, the refill must be reliably retained in the packaging device, that is to say that the removable refill must not be transferred accidentally into its release position.

DISCLOSURE OF THE INVENTION

There is therefore a need to benefit from a packaging device for a cosmetic product refill that encourages retention of the case with a view to reusing it for a new refill, while still being attractive for the consumer.

The invention meets this need by virtue of a packaging device, of longitudinal axis X, for a cosmetic product refill fitted with a pump dispenser system for dispensing the cosmetic product contained in the refill, the pump dispenser system having a pump body and a pushbutton which is movable with respect to the pump body between a low dispensing position and a high storage position, the device comprising a case provided with a cavity for accommodating the refill and having an open upper end and a lower end delimited by a first bottom, the refill being able to be removably fixed to the open end of the case by a temporary joining mechanism between an insertion position, in which the refill is held in the case, and a taken-out position, in which the refill is taken out of the case, the refill being delimited at the bottom by a second bottom, characterized in that the temporary joining mechanism comprises an intermediate ring interposed between the case and the refill, so as to ensure the assembly of the removable refill in the case, the intermediate ring having on its radially inner face at least partially deformable projecting elements able to interact with an external holding surface of the refill, the holding surface being free from complementary reliefs to the projecting elements of the intermediate ring, and, in the insertion position, the refill is held by friction by the intermediate ring.

The advantage of the device according to the invention is mainly that it has a friction component in a technical material which makes it possible to optimally preserve the desired elasticity for long-lasting friction, by being free from materials and decorations on the other components.

The ring frictionally holds the refill, while still making it possible to have the desired materials and decorations on the esthetic components.

According to the invention, what is proposed is a ring with flexible zones, and friction pads, made of a material which preferably has good elastic memory, such as POM or metal.

Owing to the structure of the device, the frictional forces are contained within a relatively narrow range of values, independently of the materials and finishings of the other components.

The packaging device of the invention is therefore reliable since there is little risk of the refill unintentionally moving axially, in particular when the user handles the pushbutton of the refill so as to allow the use of the fluid it contains.

Moreover, when the user grips the packaging device at the body of the refill, the fingers of the user are not placed so as to axially pull on the refill, thereby avoiding accidental release of the latter from the case.

Since the movement making it possible to insert the refill into or remove the refill from the case is axial, there is a wide range of choices regarding the esthetics of the device.

The refill and/or the case are/is preferably made of glass, in particular mineral glass.

The use of mineral glass provides durability, and allows possible recycling or reuse without the fear of deterioration of its esthetic appearance, since glass is a material which is difficult to scratch.

Moreover, glass can be easily cleaned if need be.

Glass also provides effective protection against UV rays, lateral and axial mechanical pressures, and provides the refill and/or the case with a cold feel which is pleasing during refill handling operations.

The pump dispenser system is known per se, and encompasses any pump system.

Numerous mechanisms are provided on the market. Examples of systems, among others, are described in the patent documents WO2014199095 and EP1697670.

The case preferably has a cover, also referred to as "cap" or "collar", in particular a metal cover, arranged so as to be fixed on said ring. This cover contributes to the esthetics of the case and can moreover have a function of retaining the ring.

The invention also relates to an assembly having at least one device as defined above and a replaceable refill.

The invention further relates to a cosmetic product refill intended to be used in a device as described above.

The invention also relates to a system having a device as described above and a cosmetic product.

Main Definitions

"Elastically deformable" should be understood to mean that the projecting reliefs have a certain shape memory. The expression "elastically deformable" should be understood to have a broad meaning and covers in particular the case in which the projecting reliefs, after having been deformed, return by elasticity to a position which is not strictly identical to their initial position, taking into account, for example, the nature of the material used to produce the ring and the shape thereof.

A "cross section of a component of axis X" is a section perpendicular to the axis X of the component.

The "longitudinal axis of a component" denotes the line connecting all of the centers of mass of the cross sections of a component.

A "friction" is resistance to the movement that occurs between two surfaces which are in contact.

"Rubbing" is an action of two bodies which are in contact and are moving with respect to one another or one of which is displaced with respect to the other.

PREFERRED EMBODIMENTS

Preferably, the device according to the invention has one or more of the following features, taken alone or in combination:

The external holding surface of the refill comes into contact with the intermediate ring only at the tips of the projecting reliefs. The friction between the refill and the case is enough to hold the refill properly while still countering a relatively weak force when the refill is being taken out.

An external face of the second bottom comes to bear against an internal face of the first bottom, in the insertion position of the refill. This bearing optimally holds the refill in the case.

At least one of the refill or the case is made of glass, and preferably at least the refill is made of glass. The device is environmentally friendly, degradable and recyclable.

The projecting elements of the intermediate ring have a first rubbing surface and the holding surface has a second rubbing surface interacting with the first rubbing surface, in the insertion position of the refill. Since the rubbing surfaces are arranged on the projecting elements, it is easier to insert and to take out the refill.

The projecting elements have at least one elastically deformable flexible portion that can bend when the refill is being inserted and bulge when the refill is being taken out. The projecting elements provide flexibility to the temporary joining mechanism.

The projecting elements are evenly distributed with respect to one another around the longitudinal axis X. The refill is optimally held in the case, since the frictional forces are evenly distributed.

According to a first embodiment of the invention, the projecting elements are ribs that are elongate along the longitudinal axis X.

According to a second embodiment of the invention, the projecting elements are bosses extending in respective planes oriented perpendicularly to the longitudinal axis X.

The refill has a neck with a thickness of between 0.5 mm and 4.0 mm and a body with a thickness of between 0.025 mm and 3 mm, the thickness being measured perpendicularly to the longitudinal axis X. These thicknesses are optimum for limiting the amount of glass of the refill while still avoiding its breaking.

The case has a cover arranged so as to be fixed on the ring. While still improving the esthetics, the case prevents access to the temporary joining mechanism.

The device comprises a mechanism for preventing the rotation of the intermediate ring with respect to the case, the rotation-prevention mechanism comprising a plurality of protrusions defined by the radially outer face of the intermediate ring and able to interact with a plurality of recesses provided at the open end of the case. This rotation-prevention mechanism avoids the movement of the ring with respect to the case, in particular when the refill is being inserted.

The pump dispenser system has a piston defining, with the pump body, a pumping chamber of variable volume and a dispensing duct, via which the pumping chamber can communicate with a dispensing orifice.

Preferably, the refill according to the invention has one or more of the following features, taken alone or in combination:

It contains a cosmetic product.

It is manufactured from recycled materials.

It is a recycled refill.

The invention may be better understood from reading the following detailed description of a nonlimiting exemplary implementation thereof, and from studying the appended schematic and partial drawing, in which:

BRIEF DESCRIPTION OF THE DRAWINGS

FIG. 1 shows an exploded view of an exemplary device according to the invention, FIG. 2 shows the refill, FIG. 3 is a sectional view of the device, FIG. 4 shows a front view of the device, FIG. 5 shows a perspective view in isolation of the bottom of the refill and the upper part of the case, FIG. 6 shows the assembly of the refill in the case in a cross section BB perpendicularly to the axis X, FIG. 7 shows a perspective view of the ring on its own, FIG. 8 shows a perspective view of the ring on its own from another angle, FIG. 9 shows a perspective view of another embodiment of the ring, FIG. 10 is a cross-sectional view along the longitudinal axis X of the body of the refill.

DETAILED DESCRIPTION

FIG. 1 illustrates a packaging device 1 according to the invention, of longitudinal axis X, having a refill 100 fitted with a pump dispenser system 51 and a case 202 in which the refill 100 can be fixed when not in use.

The refill 100 and the case 202 may each be manufactured in one piece by injection molding.

The refill 100 is cylindrical and is provided, at its upper end, with a neck 25 defining an opening for the fixing of the dispenser system and a body 73 which is closed at its lower end by a rounded bottom 59 and is connected to the neck 25 by the shoulder 54. The refill 100 is preferably made of mineral glass, for example transparent mineral glass.

The case 202 has a body 203, in particular made of plastics material such as PET, for example transparent plastics material, having an upper end defining an opening 204, on which is fixed a ring 40 or insert made of thermoplastic material, in particular made of POM. The upper end of the case is covered by a cover 60, in particular made of thermoplastic material such as ABS. The body 203 is closed at its lower end by a rounded bottom 39. The intermediate ring 40 composes, with a holding surface 50, a temporary joining mechanism 13.

In the example shown, the tubular lateral wall delimiting the body 203 emerges at the bottom of the body 203 and continues axially along the longitudinal axis X by defining a base 208, so as to retain the bottom 39 of the case in the raised position when it is placed on a horizontal support.

The ring 40 makes it possible to manufacture the refill 100 with quite large manufacturing tolerances, while maintaining exact mounting of the refill on the case 202. In the example shown, the ring is formed in one piece of deformable material.

With reference to FIG. 1 especially, it can be seen that the case is provided, at its upper part, with four fixing lugs 260, 270, 280, 290 attached at the top to a transverse annular part for connection to the body 203.

The outer contour of this annular part is substantially square, and each fixing lug 260, 270, 280, 290 is located in one corner.

Slots 240 may be provided through each fixing lug for the passage of tabs 240 of the ring 40 that is produced by injection molding, in order to ensure that the ring 40 is held in the case (as can be seen in FIG. 5).

The annular part 77 for connection to the body 203 defines a circular opening 204 with a diameter substantially equal to that of the ring 40. Thus, the ring 40 can be clipped over the edge of this opening by means of the fixing lugs.

The cover 60 is provided with an outer skirt 61 having, below the shoulder 63 at the base of the cylindrical neck 62, a square outer cross section.

Two positioning reliefs 64 in the form of diametrically opposite teeth, only one of these reliefs 64 being visible in FIG. 1, project around the neck 62 for the assembly of the cap 6 provided with the insert 7.

It can be seen that the ring 40, inserted between the refill 100 and the cover 60 (or collar), has four longitudinal ribs 41, 42, 43, 44 on the inside that are parallel and equidistant and extend in respective planes oriented parallel to the longitudinal axis X of the case 202.

When the refill 40 is being mounted in the case 202, the refill 100 is held in the case 202 by friction between the surfaces of the longitudinal ribs and the holding surface 50 defining the upper part of the body 73 of the refill 100. In the example shown, the holding surface 50 is substantially smooth.

The four longitudinal ribs 41, 42, 43, 44 coming to bear against the holding surface 50 define an overthickness t in order to obtain the radial clamping sought between the refill 100 and the case, providing the friction.

FIG. 2 shows the refill, having the body 73 and the pump dispenser system 51, the holding surface 50 intended to interact with the longitudinal ribs 41, 42, 43, 44 being located at the base of the shoulder 54, in the axial continuation of the system 51.

In the example shown, the bottom of the refill 100 is rounded but it could be different, inasmuch as it can come to bear against the bottom of the case 202.

FIG. 3 shows the refill assembled in the case, the two having complementary shapes allowing a contiguous arrangement, more or less clamped, of the cylindrical body of the refill 100 in the cylindrical body of the case 202.

The pump dispenser system 51 has a pump body 2 and a pushbutton 3 movable along an axis X with respect to the pump body 2.

The body of the pushbutton is provided with an outlet channel 51 perpendicular to the longitudinal axis X leading outside by way of an end 5, for dispensing the product.

The pump body 2 is made in one piece with an internally threaded mounting skirt 11 intended to be screwed on the neck 25 of the refill by means of the complementary thread 91. The mounting skirt 11 is attached to the pump body 2 by a ring of material 46.

The pump 51 has a dispensing duct 52 of longitudinal axis X, in which is slidingly mounted a piston (not shown), defining with the tubular wall 14 and the bottom wall 15 a pumping chamber 34. The pump 51 has a dispensing duct 52 of longitudinal axis X leading to the dispensing orifice 5.

In this instance, the pump body 2 has the cylindrical wall 14 of axis X and the bottom wall 15 generally perpendicular to the axis X.

The bottom wall 15 is attached in its center to an end piece 18, the lower part of which serves to mount a dip tube (not shown) and a shoulder 19, against which the upper end thereof can come to bear.

The end piece 18 likewise has, above the shoulder 19, a frustoconical wall forming a seat against which a ball constituting the member forming the shutter of an intake valve can come to bear.

The pump dispenser system 51 is screwed on the body of the container assembled in the case.

FIG. 4 shows the case 202 containing the refill and closed by the cap 6.

FIG. 5 shows the lower part of the refill 100 positioned above the upper part of the case 202 when the refill 100 is being assembled in the case 102. The longitudinal ribs 41, 42, 43, 44 of the ring form braking means so as to provide flexible rubbing between the refill 100 and the ring 40. The flexible rubbing is ensured by elastic deformation of the ribs on passage of the body of the refill, the tips of the ribs 41, 42, 43, 44 at rest defining, without the refill 100, an opening section the width d1 of which is slightly less than the width d2 of the body of the refill 100.

This arrangement results in the refill 100 being clamped properly in the case 202. As a preferred exemplary embodiment, the difference between the width d1 defined by the ribs and the width d2 of the refill is advantageously between 0.02 mm and 0.3 mm, and preferably between 0.08 mm and 0.15 mm.

In FIG. 6, it can be seen that the cover 60 has an outer skirt 61 of square cross section perpendicularly to the axis X, having recesses 26, 27, 28, 29 on the inside that press against the rotation-prevention protrusions 46, 47, 48, 49 of complementary shape which are made in the outer surface of the ring 40, thereby ensuring the hold. These protrusions, once they are engaged in the recesses, prevent the ring 40 from rotating relative to the neck of the case.

The refill 100 is mounted in the ring 40 with a clamped fit, possibly reversible, the refill 100 being sheathed by force in the receiving cavity of the case 202, until the bottom 59 of the refill 100 butts against the bottom 39 of the case and the holding surface 50 is retained by the ribs 41, 42, 43, 44. In this insertion position, the tips 61, 62, 63, 64 of the ribs 41, 42, 43, 44 are compressed and flatten under the effect of being stressed by the holding surface 50. The ribs at least partially return to their rest position when the refill 100 is taken out of the case 202.

The ring 40 may have tabs 81, 82, 83, 84 coming to bear against the fixing lugs 260, 270, 280, 290 of the case 202, each tab being located between two protrusions 46, 47, 48, 49. The longitudinal axis of the tabs may extend parallel to the lateral edges 470, 471, 472, 473 defining the lateral recesses 27, 29 and come to bear against the fixing lugs 260, 270, 280, 290 defining the lateral recesses 26, 28.

The width d4 of each recess 26, 27, 28, 19 is substantially equal to the width d3 of the protrusions 46, 47, 48, 49, such that the engagement of the protrusions in the recesses ensures that the ring 40 is locked in the case 202.

In the variant shown in FIG. 7, the tabs 81, 82, 83, 84 have a planar part 57, 58 oriented perpendicularly to the longitudinal axis of the device, continued by an upwardly and inwardly inclined end part. The end part may rest, as illustrated in FIG. 6, by way of an edge 81*a*, 82*a*, 83*a*, 84*a* against fixing lugs.

Each elastically deformable longitudinal rib 41, 42, 43, 44 extends over only a portion of the height of the ring 40, in particular over a height less than three quarters of the height of the ring. It is bordered by two parallel, substantially longitudinal slots 97, 98 extending along the longitudinal axis X, each slot having a right-angled peripheral segment 99, forming a return, in order to increase the elasticity of the ring 40.

The ring 40 has overthicknesses in the form of protrusions 46, 47, 48, 49 coming to bear against an internal wall of the cover 60 when the collar is mounted on the body 203 of the case.

The variant shown in FIG. 8 is identical to that of FIG. 7 except that it does not have tabs 81, 82, 83, 84.

In the variant shown in FIG. 9, the ring is provided with two rotation-prevention protrusions 71, 72 on the outside that are arranged opposite to one another with respect to the longitudinal axis X. It is provided on the inside with four bosses 61, 62, 63, 64 distributed evenly around the longitudinal axis X. The elasticity of the plastics material of the ring 40 allows the bosses to flatten when the refill 40 is being inserted and to rise when the refill 40 is being taken out. The bosses 60 are shaped by injection molding with the rest of the ring 40. According to the invention, the projecting elements could also be ridges, cells, beads or any other reliefs able to engage with the refill.

In the variant shown in FIG. 10, the neck 25 of the refill has a thickness E equal to 2.75 mm, greater than the thickness e of the tubular body 73, equal to 1.20 mm. By adjusting the thickness E of the neck and the thickness e of the body in this way, the refill is both resistant to the stresses to which it is subjected, exerted especially on the neck 25 by the screwing of the pump dispenser system 51, and has a lean shape owing to the thin body 73.

In order to use the device 1, the user takes the refill 100 out by pulling the mounting skirt 11 of the refill in one hand between two fingers and the body 203 of the case in the other hand and by exerting a greater force on the refill 100 than the frictional force between the ring and the refill. The elasticity of the plastics material of the ring 40 allows the bosses or the ribs to flatten to as to let the refill slide out of the case 202 when the user pulls the refill axially out of the case.

Once the refill has been used, the user can proceed to change it, while still retaining the case 202.

After the refill has been changed, a new refill 202 is inserted into the case until the bottom of the refill butts against the bottom of the case and the refill is held in the insertion position by friction of the projecting reliefs and the holding surface 50.

Of course, the invention is not limited to the examples that have just been described.

For example, the glass body 73 of the refill 100 may be produced with a shape that does not have symmetry of revolution.

The pump dispenser system 51 may be fixed on the case 202 with sealing, for example by providing a flexible seal.

The invention claimed is:

1. A packaging device, of longitudinal axis, for a cosmetic product refill fitted with a pump dispenser system for dispensing the cosmetic product contained in the refill, the pump dispenser system having a pump body and a push-button which is movable with respect to the pump body between a low dispensing position and a high storage position, the device comprising:

a case provided with an accommodation cavity to accommodate the refill and including an open upper end and a lower end delimited by a first bottom, the refill being configured to be removably fixed to the open end of the case by a temporary joining mechanism between an insertion position, in which the refill is held in the case, and a taken-out position, in which the refill is taken out of the case, the refill being delimited at the bottom by a second bottom, wherein the temporary joining mechanism comprises an intermediate ring interposed between the case and the refill so as to ensure the assembly of the removable refill in the case, the intermediate ring including on its radially inner face at least partially deformable projecting elements configured to interact with an external holding surface of the refill, the holding surface being free from complementary reliefs to the projecting elements of the intermediate ring, and, in the insertion position, the refill is held by friction by the intermediate ring.

2. The device as claimed in claim 1, wherein the external holding surface of the refill comes into contact with the intermediate ring only at the tips of the projecting reliefs.

3. The device as claimed in claim 1, wherein an external face of the second bottom comes to bear against an internal face of the first bottom in the insertion position of the refill.

4. The device as claimed in claim 1, wherein the case is made of glass.

5. The device as claimed in claim 1, wherein the refill is made of glass.

6. The device as claimed in claim 1, wherein the projecting elements of the intermediate ring have a first rubbing surface and the holding surface has a second rubbing surface interacting with the first rubbing surface in the insertion position of the refill.

7. The device as claimed in claim 1, wherein the projecting elements have at least one elastically deformable flexible portion that can bend when the refill is being inserted and bulge when the refill is being taken out.

8. The device as claimed in claim 1, wherein the projecting elements are evenly distributed with respect to one another around the longitudinal axis.

9. The device as claimed in claim 1, wherein the projecting elements are ribs that are elongate along the longitudinal axis.

10. The device as claimed in claim 1, wherein the projecting elements are bosses extending in respective planes oriented perpendicularly to the longitudinal axis.

11. The device as claimed in claim 1, wherein the refill has a neck with a thickness of between 0.5 mm and 4.0 mm and a body with a thickness of between 0.025 mm and 3 mm, the thickness being measured perpendicularly to the longitudinal axis.

12. The device as claimed in claim 1, wherein the case includes a cover arranged so as to be fixed on the ring.

13. The device as claimed in claim 1, further comprising a rotation-prevention mechanism configured to prevent rotation of the intermediate ring with respect to the case, the rotation-prevention mechanism comprising a plurality of protrusions defined by the radially outer face of the intermediate ring and configured to interact with a plurality of recesses provided at the open end of the case.

14. The device as claimed in claim 1, wherein the pump dispenser system has a piston defining, with the pump body, a pumping chamber of variable volume and a dispensing duct, via which the pumping chamber can communicate with a dispensing orifice.

15. An assembly comprising:

at least one of the device as claimed in claim 1 and the replaceable refill.

16. A cosmetic product refill configured to be used in the device as claimed in claim 1.

17. The refill as claimed in claim 16, further comprising a cosmetic product.

18. The refill as claimed in claim 16, wherein the refill is manufactured from recycled materials.

19. The refill as claimed in claim 16, wherein the refill is a recycled refill.

20. A system comprising:

the device as claimed in claim 1 and a cosmetic product.

* * * * *